(12) United States Patent
Lim

(10) Patent No.: US 12,012,072 B2
(45) Date of Patent: Jun. 18, 2024

(54) LOCK CONTROL APPARATUS FOR VEHICLE AND METHOD OF CONTROLLING THE SAME

(71) Applicant: HYUNDAI MOBIS CO., LTD., Seoul (KR)

(72) Inventor: Jong Chul Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/136,000

(22) Filed: Apr. 18, 2023

(65) Prior Publication Data
US 2023/0249646 A1 Aug. 10, 2023

Related U.S. Application Data

(63) Continuation of application No. 17/892,631, filed on Aug. 22, 2022.

(30) Foreign Application Priority Data

Oct. 13, 2021 (KR) .................. 10-2021-0135585

(51) Int. Cl.
*B60R 25/24* (2013.01)
*B60R 25/04* (2013.01)
(Continued)

(52) U.S. Cl.
CPC .............. *B60R 25/24* (2013.01); *B60R 25/04* (2013.01); *G07C 9/00309* (2013.01);
(Continued)

(58) Field of Classification Search
None
See application file for complete search history.

(56) References Cited

U.S. PATENT DOCUMENTS 5,887,176 A  3/1999 Griffith et al.
7,031,665 B1 * 4/2006 Trell .................. H04M 11/04
                                                    455/418

(Continued)

FOREIGN PATENT DOCUMENTS

EP  3 670 275 A1  6/2020
EP  3 836 573 A1  6/2021
(Continued)

OTHER PUBLICATIONS

Extended European Search Report dated Jul. 21, 2023, in counterpart European Patent Application No. 23165176.1 (8 pages in English).

(Continued)

*Primary Examiner* — Carlos Garcia
(74) *Attorney, Agent, or Firm* — NSIP Law

(57) ABSTRACT

A lock control apparatus for a vehicle includes anchors to receive a signal transmitted from a terminal; a communication module to communicate using controller area network (CAN) communication; a detector installed on a door to input a detection signal; and a processor to receive the signal transmitted from the terminal from at least one of the anchors through the communication module, calculate a position of the terminal based on the signal transmitted from the terminal, determine whether to unlock the door in response to the position of the terminal and the detection signal, and control an engine to start. The processor controls the anchors to enter a sleep mode in response to waiting times of the anchors and resets the anchors to release the sleep mode and controls the anchors to enter a waiting mode in response to the number of anchors transmitting the signal from the terminal.

6 Claims, 7 Drawing Sheets

(51) Int. Cl.
*G07C 9/00* (2020.01)
*H04L 12/40* (2006.01)

(52) U.S. Cl.
CPC .......... *H04L 12/40* (2013.01); *B60R 2325/10* (2013.01); *B60R 2325/205* (2013.01); *G07C 2009/00373* (2013.01); *G07C 2009/00769* (2013.01); *G07C 2209/62* (2013.01); *G07C 2209/64* (2013.01); *H04L 2012/40215* (2013.01); *H04L 2012/40273* (2013.01)

(56) References Cited

U.S. PATENT DOCUMENTS

| | | |
|---|---|---|
| 2016/0125722 A1 | 5/2016 | Ueki et al. |
| 2020/0366335 A1 | 11/2020 | Lee et al. |
| 2021/0173066 A1 | 6/2021 | Yoon et al. |
| 2021/0250061 A1 | 8/2021 | Yoon et al. |
| 2023/0111997 A1 | 4/2023 | Lim |
| 2023/0249646 A1 | 8/2023 | Lim |

FOREIGN PATENT DOCUMENTS

| | | |
|---|---|---|
| KR | 10-1479037 B1 | 12/2014 |
| KR | 10-1479037 B1 | 1/2015 |
| WO | WO 2019/074048 A1 | 4/2019 |

OTHER PUBLICATIONS

United States Office Action dated Aug. 25, 2023, in related U.S. Appl. No. 17/892,631 (8 pages in English).
Extended European Search Report dated Dec. 19, 2022, in counterpart European Patent Application No. 22184177.8 (8 Pages in English).

\* cited by examiner

LOCK CONTROL APPARATUS FOR VEHICLE AND METHOD OF CONTROLLING THE SAME

CROSS-REFERENCE TO RELATED APPLICATION

This application is a continuation of U.S. application Ser. No. 17/892,631 filed on Aug. 22, 2022, which claims priority from and the benefit of Korean Patent Application No. 10-2021-0135585, filed on Oct. 13, 2021, which are hereby incorporated by reference for all purposes as if set forth herein.

BACKGROUND

Field

Exemplary embodiments of the present disclosure relate to a lock control apparatus for a vehicle and a method of controlling the same that switch an anchor to a sleep mode to reduce power consumption and, in order to transmit and receive a signal for unlocking a vehicle, resets the anchor to release the sleep mode, receives the signal, and unlocks the vehicle.

DISCUSSION OF THE BACKGROUND

Smart keys are introduced in Vehicles and configured to unlock doors according to a driver's approach.

In a smart key system, when a driver with a smart key approaches his/her vehicle and approaches an immobilizer unit mounted in the vehicle, the immobilizer unit performs a process of authenticating whether a smart key of the driver is a valid key, and when the smart key is the valid key, the immobilizer unit operates as a smart key function.

When the smart key function is operated in the vehicle to which the smart key system is applied, the driver having the valid smart key can access the vehicle without a manual operation and unlock a door or trunk of the vehicle, and start an engine for driving with only a simple touch without manually starting the engine.

However, the smart key system can improve the user's convenience, but there is no method of distinguishing a person who has a smart key and approaches a vehicle from a legitimate user (driver), and there is a problem in that there is no means to restrict an outsider who approaches the vehicle to open a door even when the driver having the smart key unlocks the door.

Accordingly, the method of operating a button of the smart key multiple times or registering and identifying a driver's portable terminal is performed, but there is a problem in that power consumption is high while waiting to receive a signal from the portable terminal and causes accidents such as battery discharge.

Accordingly, there is a need for a method of easily detecting a driver's approach, blocking unnecessary external access, and reducing power consumption.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to providing a lock control apparatus for a vehicle and a method of controlling the same that switch an operation mode of the plurality of anchors installed in the vehicle to reduce power consumed by a plurality of anchors and receives a signal of a terminal through the anchors to easily control a lock of the vehicle.

In addition, various embodiments are directed to providing a lock control apparatus for a vehicle and a method of controlling the same by which security performance is improved.

In one general aspect, a lock control apparatus for a vehicle includes: a plurality of anchors configured to receive a signal transmitted from a terminal; a communication module configured to communicate using controller area network (CAN) communication; a detector installed on a door and configured to input a detection signal; and a processor configured to receive the signal transmitted from the terminal from at least one of the plurality of anchors through the communication module, calculate a position of the terminal based on the signal transmitted from the terminal, determine whether to unlock the door in response to the position of the terminal and the detection signal, and control an engine to start. The processor is configured to control the plurality of anchors to enter a sleep mode in response to waiting times of the plurality of anchors, and when the signal from the terminal is received from at least one of the plurality of anchors, the processor is configured to reset the plurality of anchors to release the sleep mode and control the anchors to enter a waiting mode in response to the number of anchors transmitting the signal from the terminal.

Among the plurality of anchors, the processor may be configured to control a first anchor to enter the sleep mode when a signal is not received from the first anchor for a first time period or longer, and to maintain a second anchor in the waiting mode when a signal is received from the second anchor.

The processor may be configured to reset the plurality of anchors to enter the waiting mode when a state in which the number of anchors transmitting the signal from the terminal is less than a set number is maintained for a second time period or longer.

The processor may be configured to reset the plurality anchors to enter the waiting mode at certain time intervals in response to the number of anchors transmitting the signal from the terminal.

The processor may be configured to calculate the position of the terminal based on at least three signals received from the plurality of anchors, and to track movement of the terminal.

The processor may be configured to compare a position of the door at which the detection signal is input with the position of the terminal when the detection signal is input, and to unlock the door when the position of the door matches the position of the terminal, and to maintain the door in a locked state when the position of the door do not match the position of the terminal.

The plurality of anchors may be configured to: receive the signal from the terminal periodically in a unit of a first time, terminate waiting when the signal of the terminal is received in a $n^{th}$ round within the first time, and wait again after a next first time, and maintain a waiting state when the signal from the terminal is not received within the first time, and enter the sleep mode by the processor when the signal from the terminal is not received for a first set time.

The plurality of anchors may be configured to operate with a first current in the waiting mode, and to operate with a second current smaller than the first current in the sleep mode.

The plurality of anchors may be installed at a plurality of positions of the vehicle to transmit the signal from the terminal to the processor through the communication module when receiving the signal from the terminal and a ultra-wide band (UWB) signal of the terminal.

The detector may be a sensor or a button installed at a handle disposed on each of a plurality of doors.

In another general aspect, a method of controlling a lock control apparatus for a vehicle includes: waiting, by a plurality of anchors installed in the vehicle, to receive a signal transmitted from a terminal; counting individual waiting times of the plurality of anchors; switching a mode of at least one of the plurality of anchors to a sleep mode in response to the waiting times of the plurality of anchors; and resetting the plurality of anchors and entering a waiting mode in response to the number of anchors transmitting the signal from the terminal when a signal is received from at least one of the plurality of anchors.

The method may further include calculating a position of the terminal based on the signal from the terminal when the signal from the terminal is received from the at least one of the plurality of anchors.

The method may further include: comparing a position of a door with the position of the terminal in response to a detection signal input from the door; unlocking the door when the position of the door matches the position of the terminal; and maintaining the door in a locked state when the position of the door does not match the position of the terminal.

The detection signal may be input from a sensor or a button installed on a handle of the door.

Entering of the sleep mode may further include: among the plurality of anchors, switching a mode of an anchor in which the waiting time is a first set time period or longer to the sleep mode; and maintaining a second anchor in the waiting mode when a signal is received from the second anchor.

Entering of the waiting mode may include resetting the plurality of anchors to enter the waiting mode when a state in which the number of anchors transmitting the signal from the terminal is less than a set number is maintained for a second set time period or longer.

According to one aspect, a lock control apparatus and for a vehicle and a method of controlling the same according to the present disclosure can switch a mode of an anchor for receiving a signal to the sleep mode so as to reduce power consumption and switch the mode according to situations so that the signal can be received, and thus it is possible to minimize power consumption by efficiently controlling the anchor, prevent the hacking of a smart key, and easily track the position of a terminal so that the performance of the anchor is improved.

According to the present disclosure, it is possible to improve stability and improve security performance of a vehicle by controlling the lock of a door.

Other features and aspects will be apparent from the following detailed description, the drawings, and the claims.

DETAILED DESCRIPTION

Figure 1:
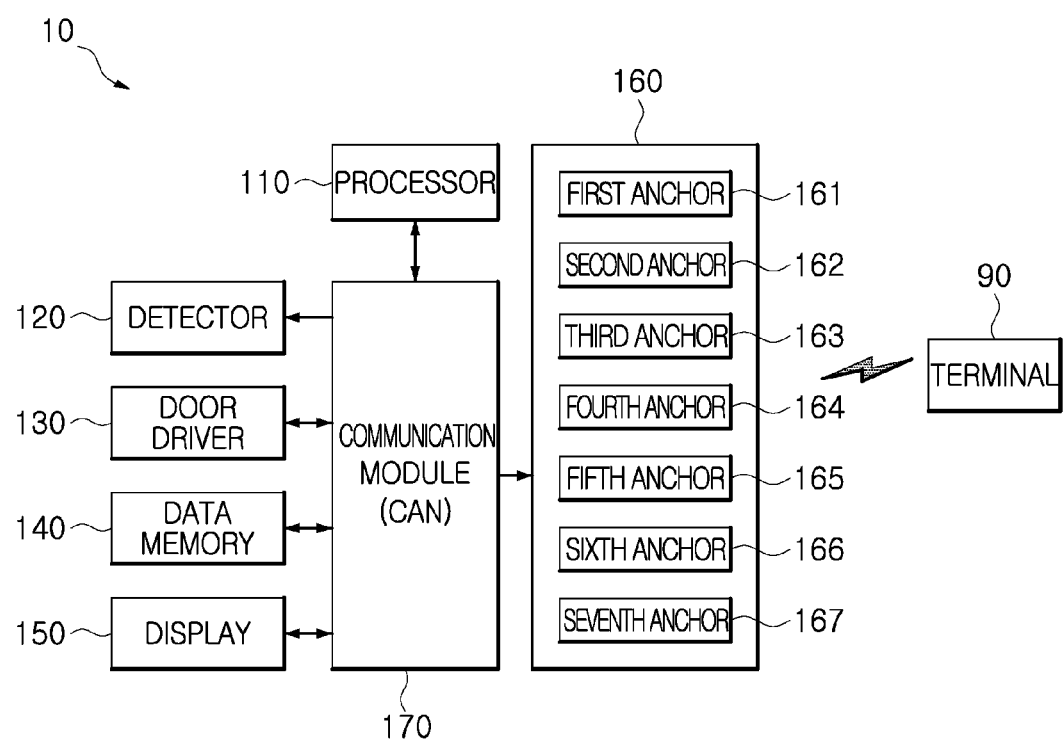
FIG. 1 is a block diagram schematically showing a configuration of a lock control apparatus for a vehicle according to one embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, the present disclosure will be described with reference to the accompanying drawings.

In this process, the thicknesses of lines or the sizes of components shown in the drawings may be exaggerated for clarity and convenience of description. In addition, terms to be described below are terms defined in consideration of functions in the present disclosure, which may vary depending on the intention or custom of a user or an operator. Accordingly, these terms should be defined based on the contents throughout this specification.

FIG. 1 is a block diagram schematically showing a configuration of a lock control apparatus for a vehicle according to one embodiment of the present disclosure.

As shown in FIG. 1, a vehicle 10 includes a plurality of anchors 160, a communication module 170, a detector 120, a door driver 130, a data memory 140, a display 150, and a processor 110 for controlling overall operations.

The vehicle 10 may be an electric vehicle or a hybrid electric vehicle that travels using a motor driven using a charged power of a battery and may be equally applied to an internal combustion engine vehicle operated by an engine.

The plurality of anchors 160 are devices for communication with a terminal 90 and receive a signal transmitted from the terminal 90.

The plurality of anchors 160 receive the signal transmitted from the terminal 90 that is an initiator (ultra-wide band (UWB) Initiator). The terminal 90 is preferably registered in advance.

In this case, the terminal 90 is a device set as the initiator and registered in advance and may use a fixed object (FOB)

or a mobile communication terminal. In addition, the terminal 90 may include a smart key.

The plurality of anchors 160 and the terminal 90 wirelessly communicate with each other in a UWB method.

The UWB is a wireless communication method that uses a signal with the bandwidth of 500 MHz or higher in a frequency band of 6 to 8 GHz and is a technique for calculating a distance between communication subjects by multiplying a signal arrival time between the communication subjects by the speed of light using a time of flight (ToF) technique.

The plurality of anchors 160 include first to seventh anchors.

The plurality of anchors 160 are installed at a plurality of positions in the vehicle 10 to receive a signal of the terminal 90 and transmit the received signal to the processor 110 through the communication module 170.

The communication module 170 transmits or receives data in the vehicle using controller area network (CAN) communication.

The communication module 170 may include a module for wireless communication other than CAN communication to receive traffic information or the like from the outside.

The detector 120 includes a plurality of sensors installed in the vehicle. The detector 120 includes a temperature sensor, a door sensor, a seating sensor, a distance sensor, etc. In addition, the detector 120 includes a button installed on a door handle.

In addition, the detector 120 further includes a proximity sensor (not shown) for detecting an object approaching the vehicle within a certain distance, and a touch sensor installed on the door handle to detect a touch.

The proximity sensor is installed on each of the plurality of doors to detect the object approaching within the certain distance, and the touch sensor receives a detection signal by detecting a case of gripping the door handle and inputs the detection signal to the processor. When the button on the door handle is operated, a detection signal may be input to the processor like the touch sensor.

The door driver 130 locks the door and unlocks the door according to a switch or button operation.

In addition, the door driver 130 locks or unlocks the door in response to the detection signal of the detector 120 and a control command of the processor 110. The door driver 130 may control opening or closing of windows installed on the door.

The data memory 140 stores control data for controlling operations of the vehicle, reference data for determining an operating state, traveling data for controlling traveling, and the like. The data memory 140 stores sensor data detected through the detector 120 and data that is transmitted or received through the communication module 170.

The display 150 includes at least one display and a plurality of lamps and displays the operating state of the vehicle, whether there is an abnormality, and the like. The display 150 may include a front navigation display, a head-up display (HUD), etc.

The processor 110 controls the traveling of the vehicle according to a traveling algorithm of an autonomous traveling system as well as a steering device (not shown) and a brake system (not shown) operating by the driver. The processor 110 controls the brake system so that a brake is automatically set when the vehicle is parked or stopped.

The processor 110 locks or unlocks the vehicle after a position of the terminal is determined in response to signals received from the plurality of anchors 160. The processor 110 may unlock any one door or may simultaneously control a plurality of doors.

In addition, the processor 110 may control an engine to start based on the signals received from the plurality of anchors 160. The processor 110 controls the engine to start when the terminal is positioned inside the vehicle.

The processor 110 may unlock the vehicle in response to the signals received from the plurality of anchors 160 and the detection signal of the detector 120.

In addition, the processor 110 may analyze the signals received from the plurality of anchors 160, calculate the position of the terminal 90, and track a change in position.

When the processor 110 receives signals from at least three anchors, the processor 110 calculates a distance between positions of the terminal 90 and the vehicle based on a triangulation method using corresponding signals. The processor 110 may calculate the position of the terminal using one or two signals. However, since a more accurate position can be calculated using three or more signals are used, it is preferable that the processor calculates the position of the terminal using three or more signals.

The processor 110 may stop waiting states of some anchors by switching the modes of some anchors to a sleep mode according to the number of anchors receiving a signal for a first set time among the plurality of anchors 160.

In addition, the processor 110 may switch the mode of the anchor to the waiting mode by resetting the anchor entered in the sleep mode to release the sleep mode.

Accordingly, the vehicle 10 may identify the position of the terminal 90 through the plurality of anchors 160 and compare the position of the terminal 90 with the location of the door according to the detection signal of the detector 120 to unlock the door at a designated position.

In addition, the vehicle 10 maintains the locked state when the position of the terminal 90 and the position of the door according to the detection signal are different. Meanwhile, when the terminal is positioned inside the vehicle, the vehicle 10 controls an engine to start based on the signal of the anchor.

FIG. 2 is a reference view for describing an operation of receiving, by an anchor, a signal of a terminal in the lock control apparatus in FIG. 1.

Figure 2A:
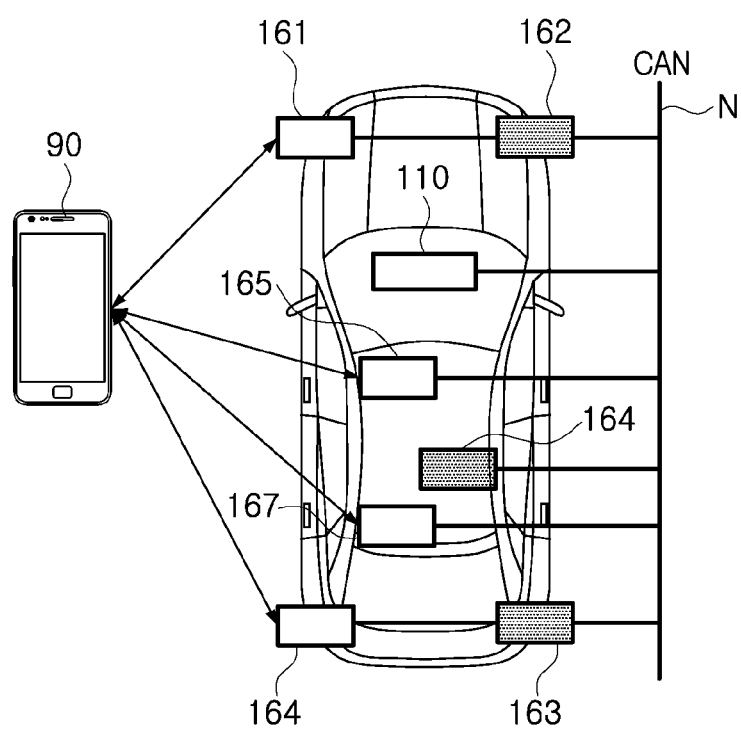
FIGS. 2A and 2B are reference views for describing an operation of receiving, by an anchor, a signal of a terminal in the lock control apparatus in FIG. 1.

As shown in FIG. 2A, the plurality of anchors 160 (161 to 167) are installed in the vehicle 10.

The plurality of anchors 160 receive a signal transmitted from the terminal 90 through UWB communication to transmit the received signal to the processor 110. Each of the plurality of anchors 161 to 167 is connected to a CAN communication line N of the communication module 170 to transmit the signal to the processor 110.

The plurality of anchors 160 receive the signal transmitted from the terminal 90 while operating in the waiting mode, and the number of anchors receiving the signal varies depending on the position of the terminal 90 and the position of the anchor.

When the terminal 90 is positioned adjacent to a driver seat at the left of the vehicle 10, a first anchor 161, a fourth anchor 164, a fifth anchor 165, and a seventh anchor 167 receive the signal of the terminal 90.

Meanwhile, a second anchor 162, a third anchor 163, and a sixth anchor 166 do not receive the signal because the vehicle 10 or objects inside the vehicle function as obstacles.

Figure 2B:
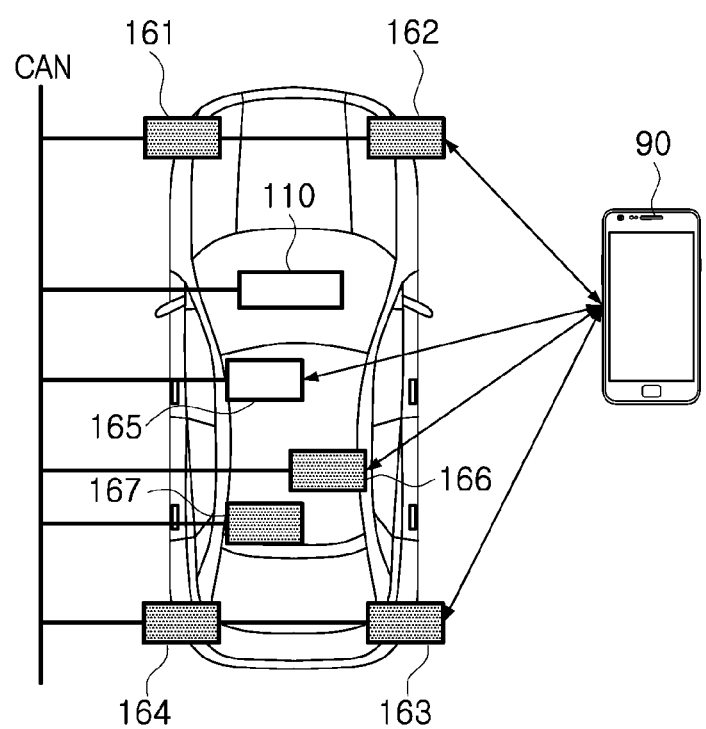

In addition, as shown in FIG. 2B, when the terminal 90 is positioned adjacent to a passenger seat at the right of the vehicle 10, the second anchor 162, the third anchor 163, the fifth anchor 165, and the sixth anchor 166 may receive the signal.

When the processor 110 receives the signal from at least one anchor, the processor 110 calculates the position of the terminal 90 in response to the received signal.

In addition, the processor 110 finds the anchor receiving the signal and controls the anchor to enter the sleep mode in response to the number of the anchors receiving the signal, a waiting time, or the like or switches the mode of the anchor in a signal waiting state to the waiting mode by resetting the anchor in the sleep mode.

As shown in FIG. 2A, the first anchor 161, the fourth anchor 164, the fifth anchor 165, and the seventh anchor 167 receive the signal of the terminal 90 at a first time to transmit the signal to the processor 110.

Meanwhile, the second anchor 162, the third anchor 163, and the sixth anchor 166 do not receive the signal of the terminal 90 and maintain the waiting mode for receiving a signal of the terminal.

The second anchor 162, the third anchor 163, and the sixth anchor 166 wait until receiving a signal of the terminal. When the anchor 160 waits for a long time, that is, the waiting time has elapsed for a first set time or longer, power consumption increases.

The processor 110 switches the mode of a corresponding anchor to the sleep mode when a state in which a signal is not received from the anchor is maintained for the first set time or longer.

The sleep mode is a mode in which the anchor operates in a power saving state in a ranging state in which the anchor waits to receive the signal of the terminal.

Meanwhile, when the terminal 90 is positioned at the same position as in FIG. 2B in a state in which the second anchor 162, the third anchor 163, and the sixth anchor 166 have entered to the sleep mode, the second anchor 162, the third anchor 163, and the sixth anchor 166 may not receive the signal due to a state in the sleep mode even in receivable positions.

Accordingly, the processor 110 resets the plurality of anchors 160 to enter the waiting mode when the state in which the number of anchors receiving the signal is less than a set number is maintained for a second set time (m).

When the fifth anchor 165 receives a signal and transmits the signal to the processor 110, the processor 110 may not identify an accurate position of the terminal, but may identify a direction of the terminal, and reset the plurality of anchors by determining that the terminal is positioned adjacent to the vehicle by a certain distance.

The processor 110 resets the plurality of anchors, and thus the second anchor 162, the third anchor 163, and the sixth anchor 166 enters the waiting mode to receive a signal of the terminal 90.

The processor 110 calculates a position of the terminal 90 based on the signals received from the second anchor 162, the third anchor 163, the fifth anchor 165, and the sixth anchor 166, and transmits the control command to the door driver 130 in response to the detection signal received from the detector 120.

Accordingly, the door driver 130 may control the door of the passenger seat to be unlocked.

Meanwhile, when a detection signal according to a handle touch is input from a door of a driver's rear seat in a state in which the terminal 90 is determined to be positioned adjacent to the passenger seat based on signals received from the second anchor 162, the third anchor 163, the fifth anchor 165, and the sixth anchor 166, the processor 110 maintains the locked state because the position of the terminal and a position at which the door attempts to be opened are different.

When the mode is set to open the door, the processor 110 may unlock the plurality of doors in response to the detection signal and the signal of the terminal.

In addition, the processor 110 determines a position of the terminal 90 based on the signals received from the plurality of anchors 160 and controls an engine of the vehicle to start when the terminal is positioned inside the vehicle.

FIG. 3 is a reference view for describing ranging for receiving the signal of the terminal in the lock control apparatus in FIG. 1.

Figure 3A:
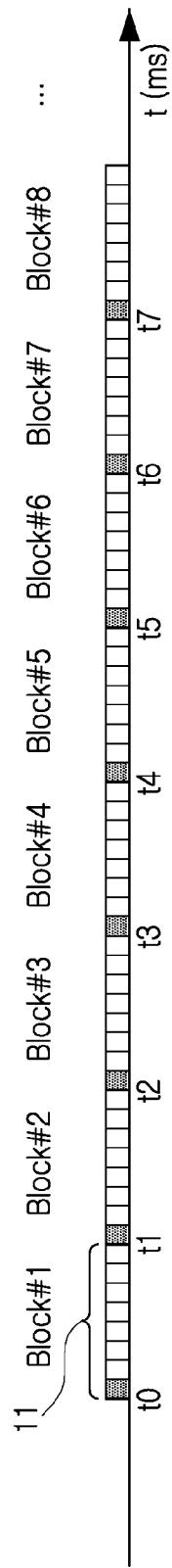
FIGS. 3A, 3B, and 3C are reference views for describing ranging for receiving the signal of the terminal in the lock control apparatus in FIG. 1.

As shown in FIG. 3A, the plurality of anchors 160 maintain a waiting state to receive a signal of the terminal 90.

A signal of the terminal is generated at a certain period, and the signal is received once per block, and the signal is transmitted for each block at certain time intervals.

Accordingly, the anchor waits to receive a signal transmitted from the terminal 90 to a first block 11 and second to eighth blocks.

When the first block 11 is in a range from a $0^{th}$ time t0 to a first time t1, each of the second to eighth blocks may maintain the waiting state at the second to seventh times t2 to t7 that have the same time interval.

One block may be composed of about 192 ms, and one round may be divided into 1 to 24 ms, but may be changed according to settings.

Figure 3B:
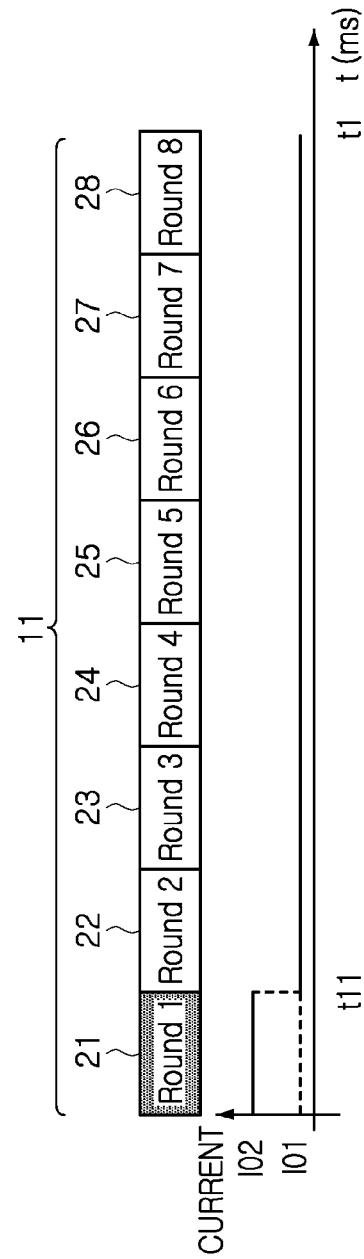

As shown in FIG. 3B, one block, for example, the first block 11 is composed of first to eighth rounds 21 to 28.

The signal of the terminal 90 may be received during one round.

In this case, a second current I02 is applied to the anchor while the anchor receives the signal, and the anchor maintains a first current I01 after receiving the signal. For example, the first current I01 is about 25 mA, and the second current I02 is about 100 mA.

Since the signal is received once in the first block 11, a corresponding anchor has the first current I01 after the signal is received in the first round 21.

Figure 3C:
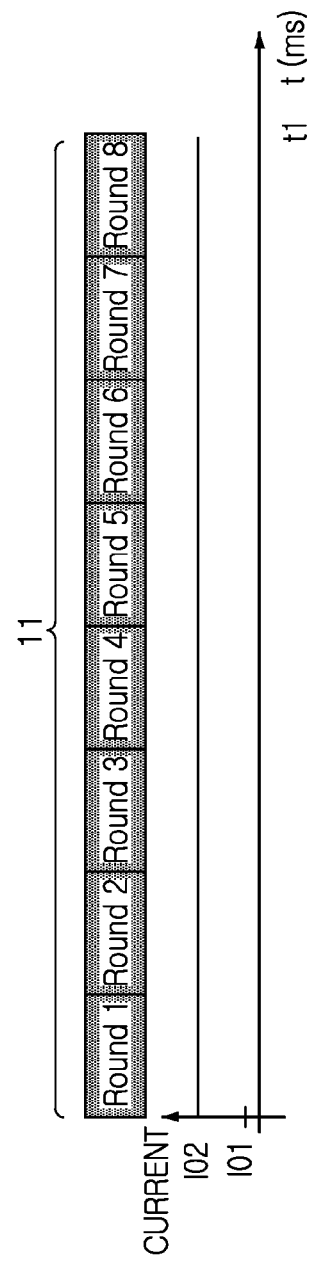

Meanwhile, as shown in FIG. 3C, when the signal is not received in the first round 21, the anchor maintains a waiting state in order of a second round 22 and a third round 23. In this case, a current of the anchor while waiting becomes the second current I02.

Accordingly, when the waiting state continues for the first set time or longer, the power consumption of the anchor increases, and when a plurality of anchors maintain the waiting state, power consumption may increase in proportion to the number of anchors.

The processor 110 controls the anchor not receiving the signal to enter the sleep mode after waiting for the first set time.

In addition, when the number of anchors receiving the signal is a certain number or less and maintained for the second set time according to the number of anchors receiving the signal, the processor 110 resets the plurality of anchors to enter the waiting mode.

For example, since at least three signals are required to track a position of the terminal 90, the processor 110 may reset the plurality of anchors when a state in which the number of anchors receiving the signal is less than 3 is maintained for the second set time or longer.

The processor 110 may calculate a position of the terminal using one or two signals even when signals are received from less than three anchors. However, since a more accurate position may be calculated when three or more signals are used, the reset of the anchor may be determined based on the three signals.

When a state in which the number of anchors receiving the signal is zero is maintained for the first set time or longer, all anchors enter the sleep mode.

In this case, when all anchors enter the sleep mode, the processor 110 may reset the plurality of anchors to enter the waiting mode periodically in a unit of a designated time because the anchor may not receive a signal of the terminal even when the terminal transmits the signal.

Figure 4:
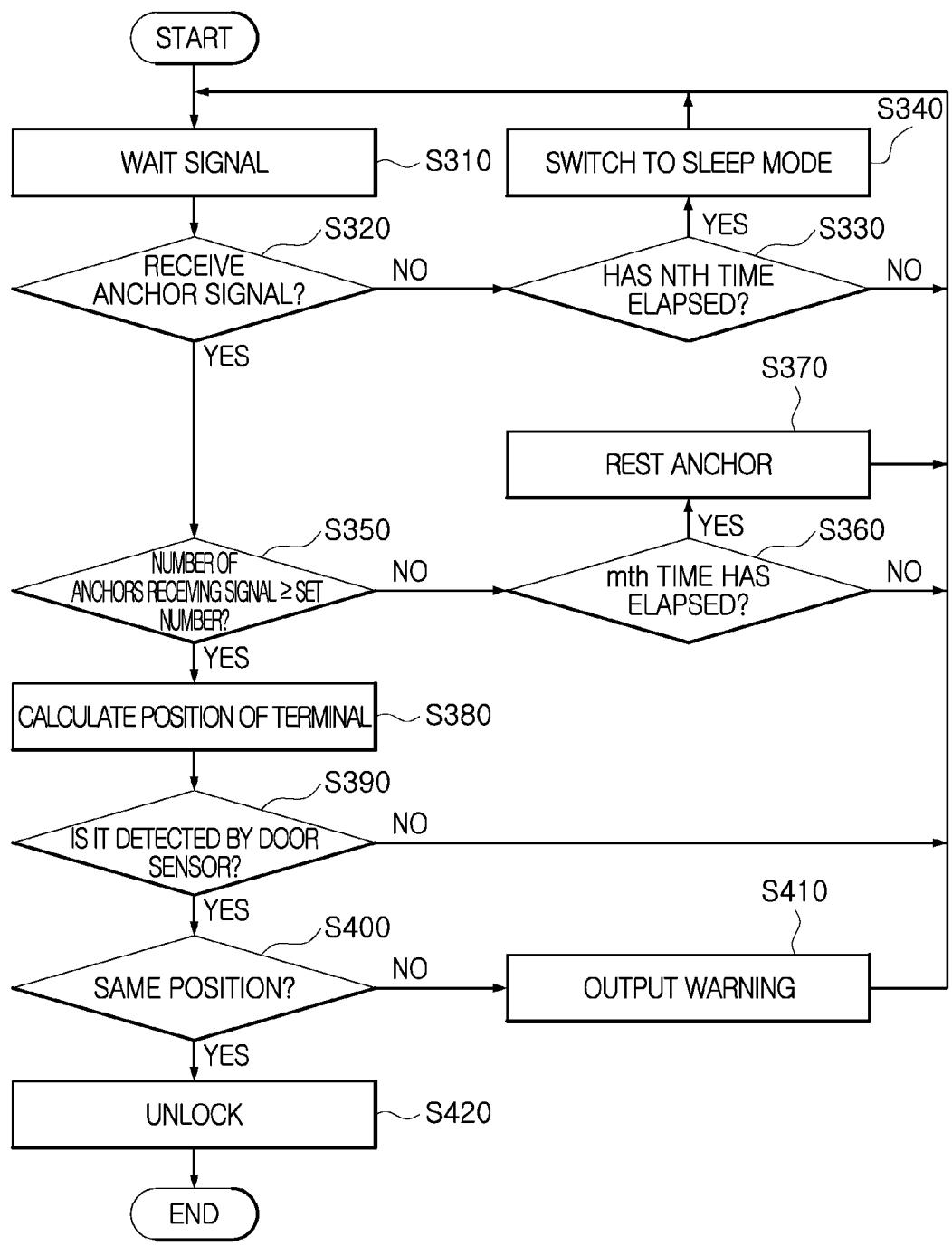
FIG. 4 is a flowchart showing a method of controlling the lock control apparatus for a vehicle according to one embodiment of the present disclosure.

FIG. 4 is a flowchart showing a method of controlling the lock control apparatus for a vehicle according to one embodiment of the present disclosure.

As shown in FIG. 4, the plurality of anchors 160 (161 to 167) installed in the vehicle 10 wait in the waiting mode to receive a signal transmitted from a corresponding terminal with respect to a pre-registered terminal 90 (S310).

When a certain anchor among the plurality of anchors receives a signal from the terminal 90 or the smart key (S320), the anchor receiving the signal transmits data for signal reception to the processor 110 using CAN communication through the communication module 170.

When the processor 110 does not receive a signal from the anchor for a first set time (n) or longer (S330), that is, when the anchor does not receive a signal of the terminal 90 for the first set time or more, the processor 110 switches the modes of the plurality of anchors to the sleep mode (S340).

For example, in a state in which the first anchor 161 and the fourth anchor 164 receive a signal at the first time and transmit the received signal to the processor 110, the processor 110 controls the first anchor 161 to maintain the waiting mode when receiving a signal from the first anchor 161 at the second time, and controls the fourth anchor 164 to enter the sleep mode when not receiving a signal from the fourth anchor 164 until the $n^{th}$ time has elapsed from the first time.

Accordingly, the first anchor 161 maintains the waiting state, and the fourth anchor 164 enters the sleep mode and does not receive the signal. When the signal is not received from the first anchor 161 until the $n^{th}$ time has elapsed from the second time, the processor 110 also switches the mode of the first anchor 161 to the sleep mode.

Meanwhile, when a signal is received from at least one anchor, the processor 110 counts the number of anchors receiving the signal, and determines whether the number of anchors receiving the signal is greater than or equal to a set number (S350).

In other words, the processor 110 receives the signal of the terminal 90 and counts the number of anchors transmitting the signal to the processor 110. The processor 110 may also calculate a position of the terminal using one or two signals, but preferably calculate a position using at least three signals in order for a more accurate position.

Accordingly, since the accurate position can be calculated using at least three signals, three or more may be used for the set number. The set number may be changed in some cases.

When the number of anchors receiving the signal is less than the set number, the processor 110 counts the time for which a state in which the number of anchors receiving the signal is less than the set number is maintained, and when the counted time is the second set time (m) or longer (S360), the processor 110 resets the plurality of anchors 161 to 167 to release the sleep mode and switches the modes of the plurality of anchors 161 to 167 to the waiting mode (S370).

When the number of anchors is less than the set number, the processor 110 calculates a position of the terminal based on the received signal.

When the number of anchors receiving the signal is greater than or equal to the set number, the processor 110 calculates a position of the terminal 90 using the plurality of signals received from the anchors (S380).

In addition, the processor 110 determines whether the detection signal is input from the detector 120 (S390).

The processor 110 may receive a detection signal received from the touch sensor installed on the door. In addition, when the button installed on the door handle is operated, the processor 110 may receive a detection signal according to the button operation.

When a door handle signal, that is, a signal from the sensor or the button, is not received, the processor 110 repeatedly calculates a position of the terminal 90 through the anchor, and tracks the position of the terminal 90 accordingly (S310 to S390).

When a signal according to the sensor or button operation of the door handle is received, the processor 110 compares a position of the door at which the signal is received with the calculated position of the terminal 90 to determine whether the positions are the same (S400).

Meanwhile, when the position of the door at which the signal is received and the position of the terminal 90 are different, the processor 110 outputs a warning (S410) and maintains the locked state.

When the position of the door at which the signal is received and the position of the terminal 90 are the same, the processor 110 unlocks the door of the vehicle 10 (S420).

When the position of the door and the position of the terminal are the same, the processor 110 may unlock only the same door as the position of the terminal according to settings. In addition, when the position of the door and the position of the terminal are the same, the processor 110 may unlock all of the plurality of doors.

In addition, when the position of the terminal is the same as the position at which the signals of the plurality of doors are received in a state in which the signals are received from the plurality of doors, the processor 110 may unlock only the door at the position at which the signal of the door is received.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A method of ranging for receiving a signal in anchors, waiting for a signal from an initiator,
   wherein the signal is generated for each block at a period;
   ranging an anchor between the initiator and the anchor based on a ranging block, wherein the ranging block is divided into ranging rounds; and
   determining whether or not the signal is received based on a time grid for a ranging session for the ranging block, wherein block timing of the ranging block is established based on a network.

2. The method of claim 1,
   wherein at least one of the anchors is connected to the initiator based on the time grid.

3. The method of claim 1,
   wherein a state for at least one of the anchors is determined based on the time grid, and wherein the state includes a sleep mode and a waiting mode.

4. A device of ranging for receiving a signal in as anchors, comprising:

a processor; and a memory configured to store control data for controlling the processor, wherein the processor is configured to:

wait for a signal from an initiator, wherein the signal is generated for each block at a period; and range an anchor between the initiator and the anchor based on a ranging block, wherein the ranging block is divided into ranging rounds; and determine whether or not the signal is received based on a time grid for a ranging session for the ranging block, wherein block timing of the ranging block is established based on a network.

5. The device of claim 4, wherein at least one of the anchors is connected to the initiator based on the time grid.

6. The device of claim 4, wherein a state for at least one of the anchors is determined based on the time grid, and wherein the state includes a sleep mode and a waiting mode.

* * * * *